United States Patent
Kelemen

[11] Patent Number: 6,145,899
[45] Date of Patent: Nov. 14, 2000

[54] SHOCK ABSORBENT SHOVEL

[76] Inventor: Michael Kelemen, R.R. #1 Site 16 Comp. 69, Vanderhoof, British Columbia, Canada, V0J 3A0

[21] Appl. No.: 09/246,813

[22] Filed: Feb. 9, 1999

[51] Int. Cl.$^7$ .................................................. B25G 1/01
[52] U.S. Cl. ............................................................ 294/57
[58] Field of Search ........................ 294/1.1, 49, 57–59, 294/54.5; 15/143.1, 145; 16/110.1, 422, 431; 74/543, 551.2, 551.8, 551.9; 81/22, 177.1, 489; 173/162.1, 162.2, 210, 211; 267/136, 137, 141, 141.1, 142, 145, 153

[56] References Cited

U.S. PATENT DOCUMENTS

| | | |
|---|---|---|
| 483,477 | 9/1892 | Ryan . |
| 654,588 | 7/1900 | Atwater ...................................... 294/57 |
| 1,634,204 | 6/1927 | Nims ...................................... 294/54.5 |
| 1,652,076 | 12/1927 | Webster . |
| 1,868,626 | 7/1932 | Coates ........................................ 16/431 |
| 2,101,869 | 12/1937 | Noble ............................... 173/162.2 X |
| 2,456,267 | 12/1948 | Gazda ........................................ 16/431 |
| 3,322,211 | 5/1967 | Alabuzher et al. ................... 173/162.2 |
| 4,478,293 | 10/1984 | Weilenmann et al. ................ 173/162.2 |
| 4,615,553 | 10/1986 | Hultine ....................................... 294/58 |
| 4,691,954 | 9/1987 | Shaud . |
| 5,157,807 | 10/1992 | Keller et al. ............................... 16/431 |
| 5,533,768 | 7/1996 | Mitchell . |
| 5,690,374 | 11/1997 | Jacobs et al. . |
| 5,727,829 | 3/1998 | Bellichak . |

FOREIGN PATENT DOCUMENTS

| | | | |
|---|---|---|---|
| 2334475 | 8/1977 | France ....................................... 294/57 |
| 373541 | 5/1932 | United Kingdom ..................... 294/57 |

*Primary Examiner*—Johnny D. Cherry
*Attorney, Agent, or Firm*—Oyen Wiggs Green & Mutala

[57] ABSTRACT

A shovel having a shock absorbing element in its hand-grip in conjunction with a rigid shaft. The rigid shaft maintains the strength and rigidity required for heavy tasks, while the hand-grip provides yielding movements so as to absorb shock force without compromising the strength of the overall shovel. The hand-grip itself can also be adapted such that it can easily be affixed to, and removed from, the shafts of different shovels, allowing for interchangeability of hand-grips between shovels.

8 Claims, 2 Drawing Sheets

SHOCK ABSORBENT SHOVEL

FIELD OF THE INVENTION

This invention relates to a shovel with a shock absorbing element in its handle.

BACKGROUND OF THE INVENTION

A shovel traditionally has a scoop attached to a handle, said handle comprising a rigid shaft and a rigid hand-grip. Although satisfactory for quick or light tasks, traditional shovels are less than ideal in respect of extended, heavy tasks where the user is likely to encounter significant forces in or from the direction of the thrust. Extended use of traditional shovels can cause strain or injury to the user, especially after a long, continuous period of use, because, when the user thrusts the shovel into an object and its forward movement is arrested by contact therewith, nothing will cushion the end thrust and the resulting shock force will transmit up the user's wrist, elbow, and shoulder, tending to lead to wear, strain, and possibly injury to the user. Therefore, a shovel should ideally have a shock absorbing element to cushion the shock force.

A number of patents, such as U.S. Pat. No. 5,690,374 and U.S. Pat. No. 4,691,954, disclose shovels with shock absorbing elements, usually in the form of a spring mechanism within a telescoping or otherwise flexible shaft. U.S. Pat. No. 5,727,829 and U.S. Pat. No. 5,533,768 similarly disclose shovels having flexible shafts. The problem with a shovel having a shock absorbing element in its shaft is that the shaft loses the strength and rigidity needed for the type of heavy tasks typically encountered in fields such as roofing, drain tiles, and landscaping. The flexible shaft makes lifting of heavy items awkward and cumbersome.

U.S. Pat. No. 483,477 discloses a shovel having both a flexible hand-grip and a flexible shaft which co-operate to the end thrust in unison therewith. The shaft has unrestricted or unconfined coil springs that may move laterally as well as vertically. Again, the flexible shaft would make such a shovel unsuitable for many applications where a strong shaft is required.

SUMMARY OF THE INVENTION

The present invention provides a shovel with a shock absorbing element in its hand-grip in conjunction with a rigid shaft. According to the present invention, the shaft of the shovel will maintain the strength and rigidity required for heavy tasks, while the hand-grip will yield so as to absorb shock force without compromising strength of the overall shovel. The hand-grip itself can also be adapted such that it can easily be affixed to, and removed from, the shafts of different shovels, allowing for interchangeability of hand-grips between shovels.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
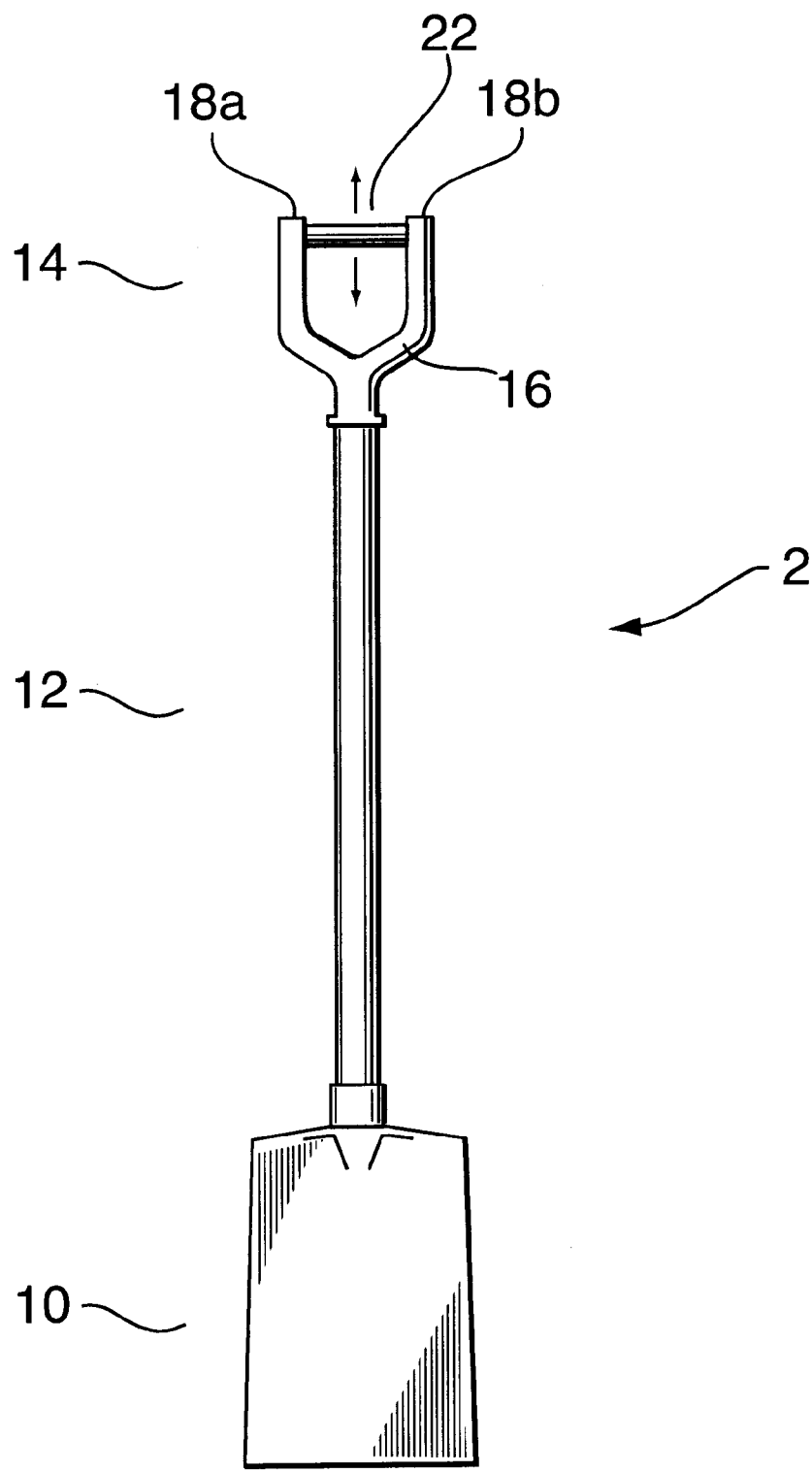
FIG. 1 is a front elevation view of a shovel with a shock absorbing element according to the present invention.

Referring to FIG. 1, a shovel 2 according to the present invention comprises a scoop 10 attached to a handle comprising a rigid shaft 12 and a hand-grip 14. The hand-grip 14 provides yielding movements in directions parallel to the axis of the shaft 12 so as to absorb shock forces transmitted up the shaft 12 from the scoop 10 before they reach the user.

Figure 2:
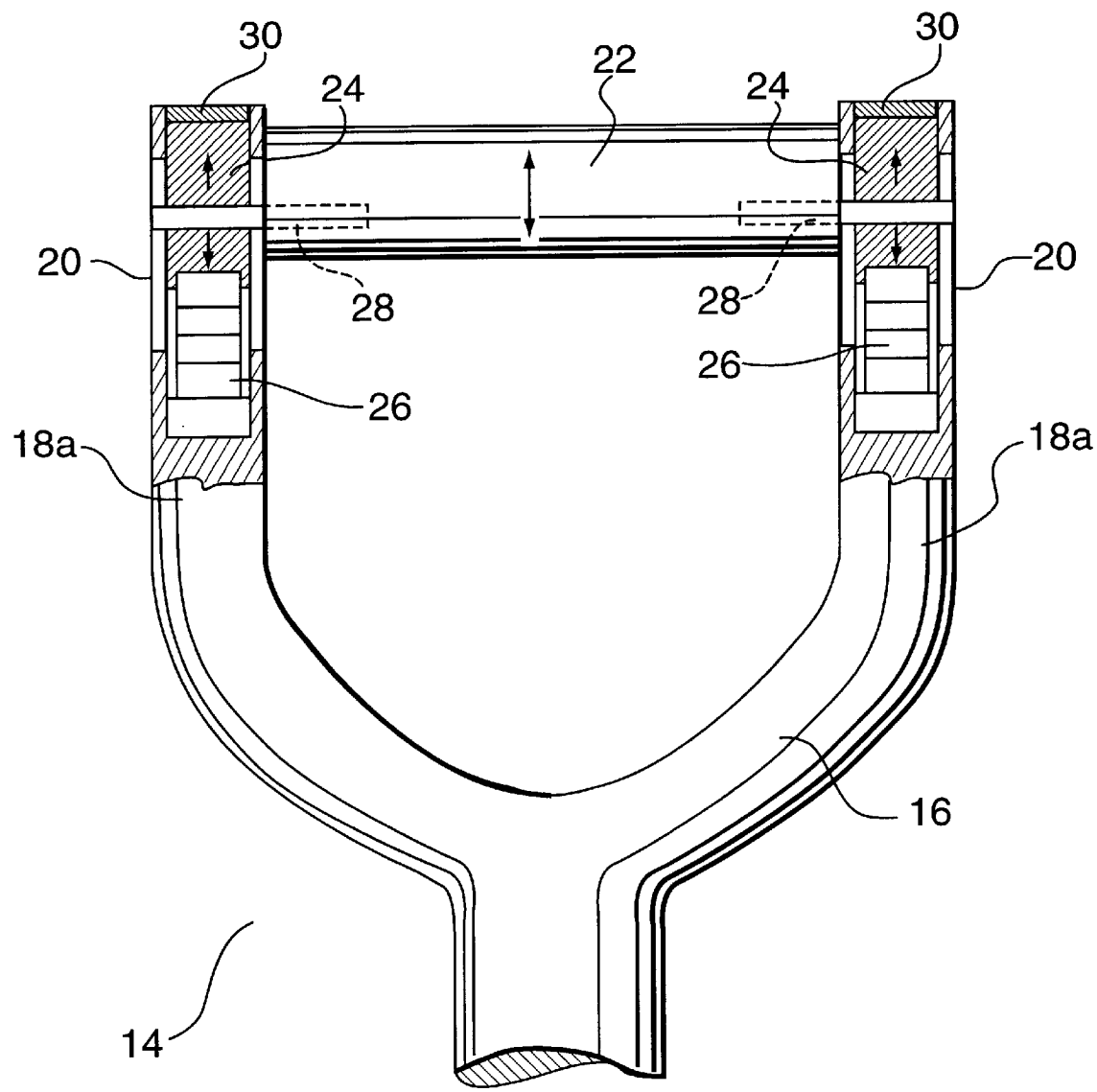
FIG. 2 is a partially cut-away view of a hand-grip with a shock absorbing element according to the present invention.

Referring to FIG. 2, the hand-grip 14 comprises a yoke 16 having prongs 18a and 18b. Each of the prongs 18a and 18b has within it a spring mechanism 20. The hand-grip 14 further comprises a rigid cross-bar 22 movable in-between the prongs 18a and 18b, said cross-bar 22 supporting on each of the prongs 18a and 18b by the spring mechanism 20 within each of the prongs 18a and 18b, so as to enable the hand-grip 14 to yield slightly when a shock force is received by the scoop 10 and transmitted up the shaft 12. A cap 30 at the top of each of prongs 18a and 18b may be either removable or fixedly attached to the top of the prong 18a or the prong 18b (as the case might be).

Each spring mechanism 20 comprises a piston 24 and a spring element 26. Each end of the cross-bar 22 is fixedly attached to a piston 24 by a pin 28. Preferably, each pin 28 attaching an end of the cross-bar 22 to a piston 24 will be affixed in such a way so as not to allow the cross-bar 22 to rotate about its own axis. In respect of each spring mechanism 20, the spring element 26 is elastically held against the piston 24 by any suitable means whereby piston 24 is restrained from moving upward within the prong 18a or the prong 18b (as the case might be) to a point where the spring element 26 is no longer compressed. Such means of restraining piston 24 may, for example, be provided by the cap 30 or by restraints on the upward movement of each pin 28.

Preferably, each spring mechanism 20 is entirely enclosed within each of the prongs 18a and 18b except for narrow vertical slots (not shown) in each of the prongs 18a and 18b toward the inside of the yoke 16 through which each pin 28 can slidingly move. This reduces the exposure of each spring mechanism 20 to weather, dirt, and so on, while confining the movement of the cross-bar 22 more-or-less to directions parallel to the axis of the shaft 12. The configuration and dimensions of the vertical slots can also be chosen such that each pin 28 and, as a result, each piston 24 is restrained from moving to a point where each spring element 26 is no longer compressed.

Each spring element 26 preferably comprises a series of stacked rubber disks, the stiffness and elasticity of which can be varied to adjust the degree of shock absorbency desired, but, of course, each spring element 26 can also take the form of traditional could springs or any other element with similar elastic characteristics (and again, the stiffness and elasticity can be varied to adjust the degree of shock absorbency desired). Rubber disks, however, will not bend or jam up like coils and rubber is inexpensive and durable. Each spring element 26 is compressible mainly along the axis of each of prongs 18a and 18b, with lateral movement not being significant; this enables the shovel 2 to absorb shock forces transmittable up the shaft 12 but without compromising the strength and rigidity that make the shovel 2 so useful in situations of heavy lifting.

In all, the yielding action of the hand-grip 14 prevents shock force from being transmitted up the shaft 12 to the wrist, elbow and shoulder of the person using the shovel 2. It also assists in retracting th shaft 12 and the scoop 10 at the termination of the stroke away from the user.

Such a hand-grip 14 can also be adapted such that it can easily be affixed to, and removed from, the shafts of different shovels, allowing for interchangeability of hand-grips between shovels. The affixation can, for example, be by means of removable clamps, fasteners, and the like.

Although a particular embodiment of the present invention has been described above, it will be understood by those skilled in the art that various changes and modifications may be made without departing from the spirit or essential attributes of the present invention. For example, instead of having a yoke, the hand-grip might have a T-shaped configuration of other configuration, provided that the shock absorbing element provides yielding movement primarily to the axis of the shaft and not laterally. Accordingly, the scope of the invention is to be construed in accordance with the substance defined by the following claims.

What is claimed:

1. A shock absorbent shovel comprising:

a scoop;

a rigid shaft having a first end and a second end, wherein the first end is fixedly and inflexibly attached to the scoop; and a hand-grip fixedly attached to the second end of the shaft, said hand-grip comprising a yoke having two prongs and a cross-bar slidingly movable in-between the two prongs in directions essentially parallel to the axis of the shaft, and said hand-grip having a shock absorbing element therein capable of providing yielding movement primarily parallel to the axis of the shaft, said shock absorbing element comprising a spring mechanism within each prong against which the cross-bar is slidingly movable, said spring mechanism within each prong comprising a piston and a spring element that is elastically held against that piston, and wherein each end of the cross-bar is fixedly attached to one of the pistons.

2. A shovel according to claim 1 wherein the spring element comprises a series of stacked rubber disks.

3. A shovel according to claim 1 wherein the cross-bar is fixedly attached to the pistons such that the cross-bar cannot rotate about its own axis.

4. A shovel according to claim 1 wherein each end of the cross-bar is fixedly attached to one of the pistons by a pin.

5. A hand-grip capable of being fixedly attached to one end of a rigid shaft to form a handle for a shovel, comprising:

a yoke having two prongs and a cross-bar slidingly movable in-between the two prongs in directions essentially parallel to the axis of the shaft; and a shock absorbing element capable of providing yielding movement primarily parallel to the axis of the shaft, comprising a spring mechanism within each prong against which the cross-bar is slidingly movable, wherein the spring mechanism within each prong comprises a piston and a spring element that is elastically held against that piston, and wherein each end of the cross-bar is fixedly attached to one of the pistons.

6. A hand-grip according to claim 5 wherein the spring element comprises a series of stacked rubber disks.

7. A hand-grip according to claim 5 wherein the cross-bar is fixedly attached to the pistons such that the cross-bar cannot rotate about its own axis.

8. A hand-grip according to claim 5 wherein each end of the cross-bar is fixedly attached to one of the pistons by a pin.

* * * * *